(12) United States Patent
Gansberger

(10) Patent No.: US 8,251,387 B2
(45) Date of Patent: Aug. 28, 2012

(54) FOLDING STEP-ON FOR A VEHICLE

(76) Inventor: Theodore Thomas Gansberger, Winters, CA (US)

( * ) Notice: Subject to any disclaimer, the term of this patent is extended or adjusted under 35 U.S.C. 154(b) by 0 days.

(21) Appl. No.: 13/013,015

(22) Filed: Jan. 25, 2011

(65) Prior Publication Data

US 2011/0193310 A1 Aug. 11, 2011

Related U.S. Application Data

(60) Provisional application No. 61/337,622, filed on Feb. 10, 2010.

(51) Int. Cl.
*B60R 3/00* (2006.01)
(52) U.S. Cl. ...................................................... 280/166
(58) Field of Classification Search .................. 280/163, 280/164, 165, 166, 477, 164.1, 491.1; 187/200–202; 296/62
See application file for complete search history.

(56) References Cited

U.S. PATENT DOCUMENTS

| | | | | |
|---|---|---|---|---|
| 714,736 | A * | 12/1902 | Peepels | 83/544 |
| 1,355,408 | A * | 10/1920 | Moody | 296/24.36 |
| 5,803,475 | A * | 9/1998 | Dick | 280/163 |
| 6,170,843 | B1 * | 1/2001 | Maxwell et al. | 280/166 |
| 6,530,588 | B1 * | 3/2003 | Varney et al. | 280/166 |
| 6,685,204 | B1 * | 2/2004 | Hehr | 280/166 |
| 6,994,362 | B2 * | 2/2006 | Foster | 280/163 |
| 7,168,722 | B1 * | 1/2007 | Piotrowski et al. | 280/166 |
| 7,185,904 | B1 * | 3/2007 | Jones et al. | 280/166 |
| 7,195,262 | B2 * | 3/2007 | Chaudoin et al. | 280/166 |
| 7,258,359 | B2 * | 8/2007 | Wooten | 280/491.5 |
| 7,261,357 | B1 * | 8/2007 | Bechen | 296/62 |
| 7,422,263 | B2 * | 9/2008 | Pritchard | 296/62 |
| 7,490,889 | B1 * | 2/2009 | Scoggins | 296/62 |
| 7,503,572 | B2 * | 3/2009 | Park et al. | 280/163 |
| 7,661,693 | B1 * | 2/2010 | Lipski | 280/491.5 |
| 7,766,357 | B2 * | 8/2010 | Arvanites | 280/166 |
| 7,775,536 | B2 * | 8/2010 | Shumway | 280/164.1 |
| 7,954,836 | B2 * | 6/2011 | Mann | 280/163 |
| 2002/0008364 | A1 * | 1/2002 | Kahlstorf | 280/515 |
| 2003/0116938 | A1 * | 6/2003 | Shields et al. | 280/166 |
| 2004/0217573 | A1 * | 11/2004 | Foster | 280/166 |
| 2005/0275187 | A1 * | 12/2005 | Chaudoin et al. | 280/166 |
| 2006/0066121 | A1 * | 3/2006 | Derosier | 296/62 |
| 2006/0170179 | A1 * | 8/2006 | Dahl | 280/163 |
| 2008/0100024 | A1 * | 5/2008 | Leitner et al. | 280/166 |
| 2009/0008896 | A1 * | 1/2009 | Phillips | 280/166 |
| 2009/0079157 | A1 * | 3/2009 | Fratzke | 280/166 |
| 2009/0243249 | A1 * | 10/2009 | Arvanites | 280/166 |
| 2010/0007116 | A1 * | 1/2010 | Columbia | 280/511 |
| 2010/0207415 | A1 * | 8/2010 | King et al. | 296/62 |

* cited by examiner

*Primary Examiner* — John Walters
*Assistant Examiner* — James Triggs
(74) *Attorney, Agent, or Firm* — Oakwood Law Group, LLP; Yuchien Wei

(57) ABSTRACT

A horizontally foldable step assembly for vehicles. The foldable step assembly includes an arm for coupling with a hitch receiver and an arm for mounting a pivotally mounted step supporting assembly. The step supporting assembly is capable of rotating horizontally from a "closed" position to an "open" position, and being secured at the position by a locking mechanism.

6 Claims, 3 Drawing Sheets

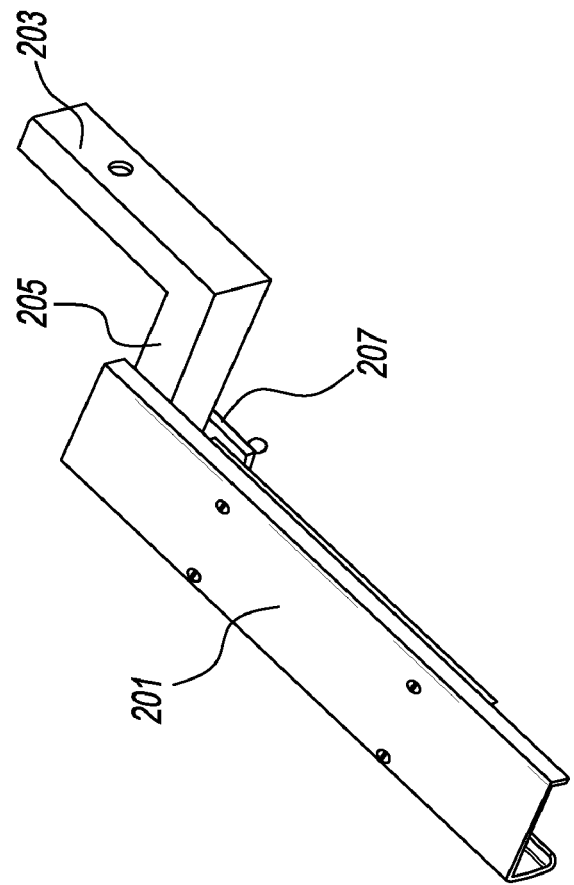
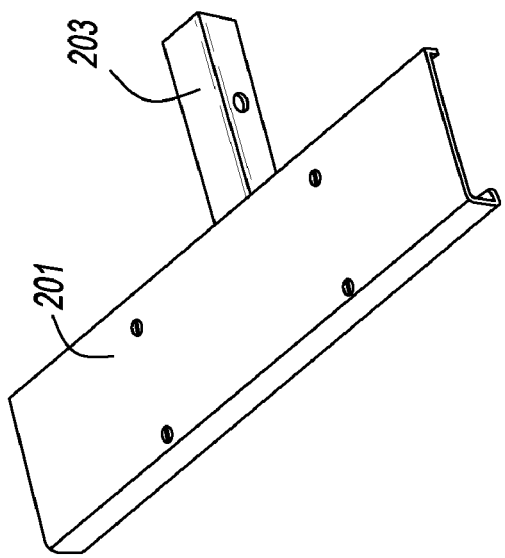
FIG. 2B
FIG. 2A

FOLDING STEP-ON FOR A VEHICLE

CROSS-REFERENCES

Priority is claimed from the U.S. Provisional Patent Application 61/337,622 filed on Feb. 10, 2010, the entirety of which is hereby incorporated by reference.

DESCRIPTION OF RELATED ART

The present application relates to an attachable accessory for a vehicle, and more particularly to a mountable folding step that can be mounted to the hitch of a vehicle to provide a middle step-on for loading or climbing a vehicle cargo.

Note that the points discussed below may reflect the hindsight gained from the disclosed inventions, and are not necessarily admitted to be prior art.

Due to their ample cargo and storage space, pick-up trucks and SUVs, vans are becoming increasingly popular. Typically these vehicles have a tailgate that tends to have a high ground clearance, making entry to the cargo area difficult. Various attempts have been made to mitigate this problem by providing a platform mountable to the rear hitch of a vehicle. Several patents discloses attachable steps, for example, the U.S. Pat. No. 6,145,865 discloses a combined trailer hitch cover and step assembly wherein the step assembly folds up to cover the hitch socket. However, the added foldable step is very close to the bumper, not easy and comfortable for standing on.

Another US patent application US 2001/0045720 A1 provides a solution by disclosing a foldable step assembly that is adjustably mountable with a trailer hitch receiver so that the distance from the step plate to the rear side of the vehicle is adjustable. However since the step plate is pivotally mounted to a mount shank and foldable from a horizontal use position to a vertical storage position, the step plate cannot be vertically stretch structured because of the vertical storage position, limiting its step-on space when at unfolded use position.

US patent application US 2005/0275187 A1 provides another solution in increasing step-on space, wherein a hitch-mounted step extends substantially entirely beyond a deployed drop-down tailgate of a vehicle. However, the step is vertically folded up for storage position, does not provide an elegant aesthetically pleasing appearance for the rear end of a vehicle.

SUMMARY

The present application discloses a new approach to a folding step that is mountable to a hitch receiver of a vehicle and also provides sufficient step-on space and aesthetical elegance.

In one embodiment, a folding step assembly includes supporting base comprising a first and a second arm being mounted together perpendicularly forming a 90 degree angle at their joint, the "L" shaped supporting base is horizontal to the surface of the earth.

In one aspect of an embodiment, the first arm is pivotally mounted with a step-plate support assembly that rotates around the vertical axis of the end of the first arm to form a folded "in" position and an extended "out" position.

In another embodiment, a notch plate is amounted to the joint connection between the first arm of the hitch receiver and the step-plate support. The notched plate locks and secures a securing rod of the support assembly into the "in" position or the extended "out" position, and the securing rod physically and fixedly disposed with step-plate supporting bars.

In another embodiment, underneath the securing rod and the supporting bar is a heavy-duty support bar for further support the weight of a person who steps on the step plate.

This simple folding step assembly, in various embodiments, provides a mountable, removable, yet strong and elegant attachment accessary to a vehicle, especially pick-up trucks, commercial transportation trucks, moving trucks and u-hauls, to add an intermediate step between the truck cargo and the ground, for a person to easily climb up and down the rear-end cargo, eliminating the pain in loading up a big cargo.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 2A shows a perspective view of an example folding step assembly at an "in" position in accordance with this application.

FIG. 2B shows a perspective view of an example folding step assembly at an extended "out" position in accordance with this application.

DETAILED DESCRIPTION OF SAMPLE EMBODIMENTS

Figure 1B:
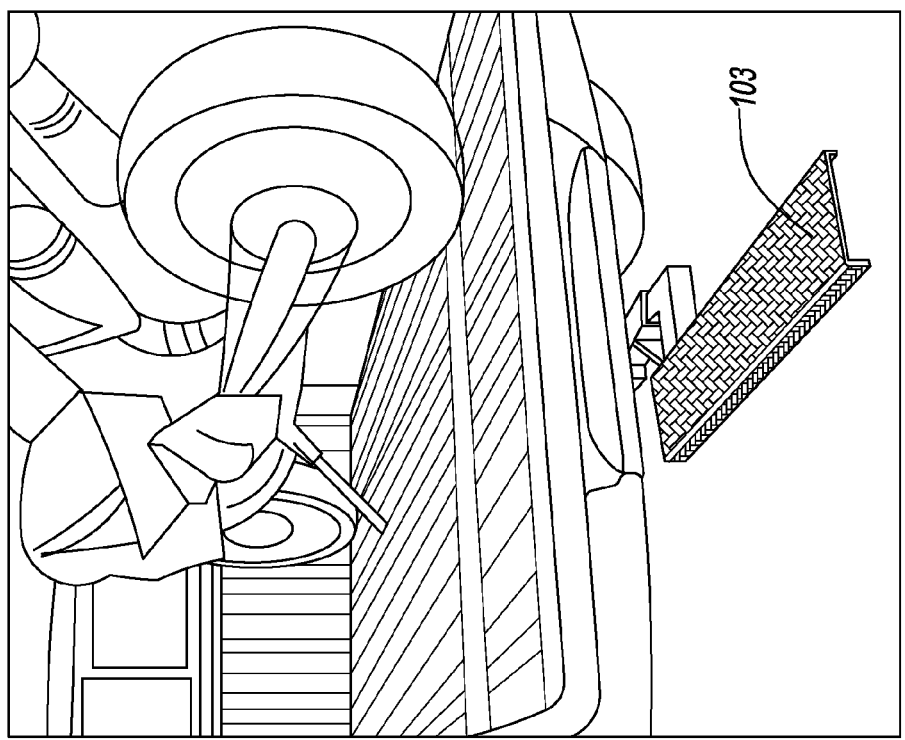
FIG. 1B shows a picture of an example mounted folding step at the rear end of a pick-up truck at an extended "out" position in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

It is contemplated and intended that the disclosed configuration and design apply to all types vehicles that currently present difficulties in climbing up and down the cargo space, for example, all commercial heavy duty trucks, light to medium duty pick-up trucks, u-hauls, SUVs, and other types of transportation vehicles. For clarity reason, the examples used in this application are light weight pick-up trucks. A person skilled in the art will know the modifications and adjustments to the disclosed structure to make the design fit to other types of trucks and vehicles.

Figure 1A:
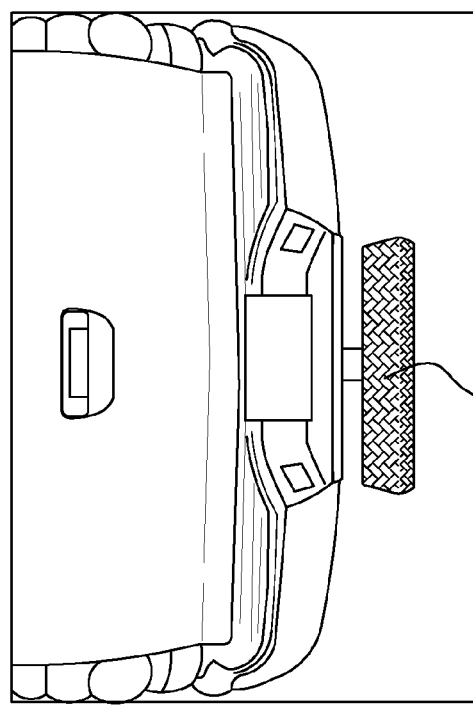
FIG. 1A shows a picture of an example mounted folding step at the rear end of a pick-up truck at an "in" position in accordance with this application.

In reference to FIG. 1A, a folded "in" positioned step-on assembly 101 is mounted on the hitch receiver at the rear end of a truck. In FIG. 1B, step-on assembly 103 is mounted at the extended "out" position for providing sufficient step-on space, for example, to up load a motor vehicle to the rear cargo of the truck.

In reference to FIG. 2A, the folded step-on assembly includes a step-on plate 201 and a coupling arm 203 for the hitch receiver of a truck. In FIG. 2B, when the step-on assembly extends from the folded state, the step-on plate 201 rotates a certain degree, for example, preferably 90° degree, away from the coupling arm 203, exposing the supporting arm 205 which is anglely, preferably 90° degree, joined to the coupling are 203 for holding up the step-on plate 201. Supporting arm 205 and hitch coupling arm 203 form an "L" structure that is mountable to a hitch receiver with arm 205 horizontally placed and parallel to the earth surface. Step-on plate 201 is mounted to supporting arm 205 using a supporting and securing mechanism 207 that is detachable.

Figure 3:
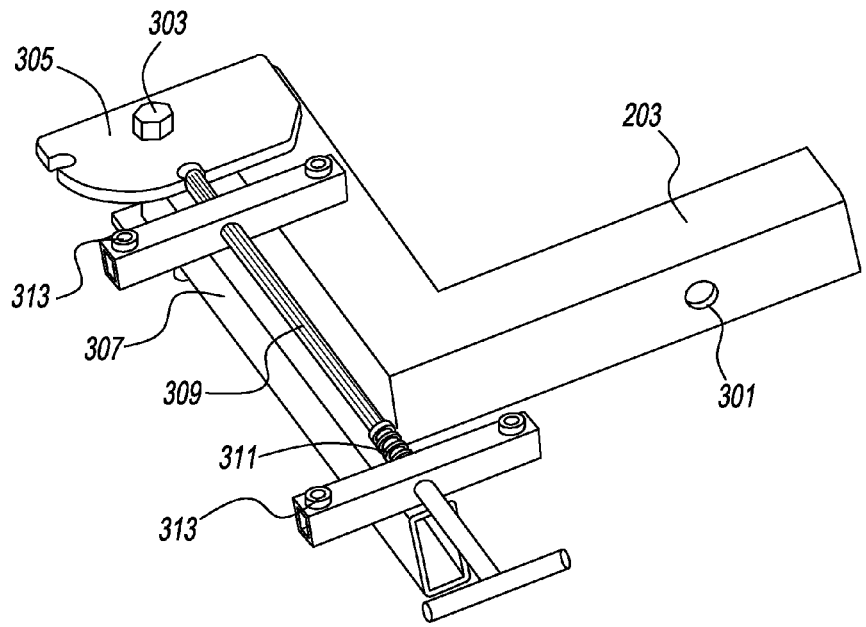
FIG. 3 shows a perspective view of an example folding step assembly without the step plate at an "in" position in accordance with this application.

In reference to FIG. 3, the step-on assembly includes a coupling arm 203 in the shape of a square tubular elongation that can slide into a trailer hitch receiver. A hole 301 on coupling arm 203 is configured to hold a hitch pin to secure the assembly in the hitch receiver.

A plate supporting assembly is pivotally mounted at the free end of the supporting arm 205, the plate supporting assembly includes a support shank 307, a securing rod 309, and a notched securing plate 305. Securing plate 305 is fixedly and with the plate horizontally disposed on top of support bar 307. Securing plate 305 has at least two notches for locking securing rod 309 at either the "closed" position or the "extended" position with a different notch on the plate being used for each position. The notches may be threaded. The end of securing rod 309 secures into one of the notches, and be held in the notch plate 305. The position of securing rod 309 may be further strengthened by a spring 311 fixedly disposed on support bar 307, so that securing rod 309 would not slip away from the support shank 307.

On the securing rod 309, at least two support bars 313 are fixedly mounted, and a step plate 201 is bolted to the support bars with at least four bolts. In "closed" position the plate supporting assembly is positioned near the supporting arm 205, and securing rod 309 is locked in the notch on securing plate 305 that is closest to the supporting arm 205.

Figure 4:
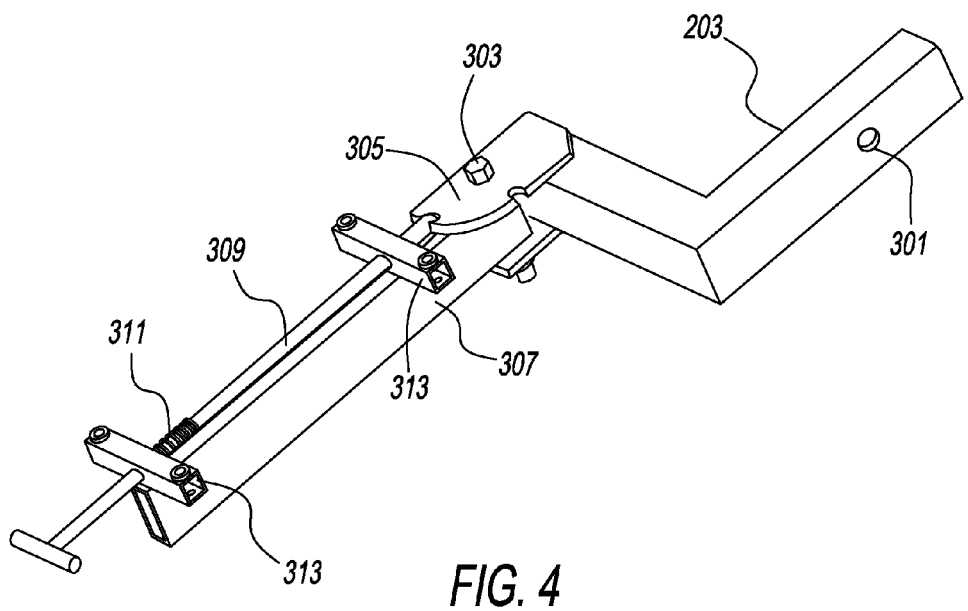
FIG. 4 shows a perspective view of an example folding step assembly without the step plate at an "out" position in accordance with this application.

In use, as shown in FIG. 4, the entire plate supporting assembly except securing plate 305 rotates levelly to a notch on the securing plate 305 that is farther away from the supporting arm 205, i.e. the "open" stretched position. The stretched position is then secured by locking the securing rod 309 into the notch. The locking mechanism may be performed by inserting securing rod 309 into a notch.

In operation the step plate is in the out position as shown in FIG. 2B. In this position the step plate extends beyond the tail gate—even when tail gate is in the down position—making a convenient step into the cargo area of a pick-up truck. The step plate is also off set to the left of the cargo area due to the off-set pivot 207 in FIG. 2B which is adjustable. This leaves more room to position a motorcycle loading ramp to the right of the step. This room is necessary when pushing a large motorcycle up a loading ramp or rolling it down. When not in use the step is in the position FIG. 2A close to the bumper. Due to the off set pivot 207 the step is centered creating a more aesthetically pleasing appearance than a non symmetrical step.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Additional general background, which helps to show variations and implementations, may be found in the following publications, all of which are hereby incorporated by reference herein for all purposes: US patent applications US 2005/0275187 A1, US 2001/0045720 A1, and U.S. Pat. No. 6,145,865.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A foldable step assembly engageable with a trailer hitch receiver, comprising:
    a supporting base comprising a first arm and second arm, said first arm and said second arm being joined forming a "L" shape, said first arm having a first free end for coupling with a hitch receiver, said second arm having a second free end;
    a securing plate having plurality of notches, mounted to said second free end of said second arm;
    a supporting shank pivotally mounted to said securing plate, wherein said supporting shank rotates horizontally between an "in" position and an "open" position; and
    a step plate mounted on said supporting shank with or without an intermediate mechanism, when said supporting shank is in an "in" position said step plate on said supporting shank is parallel with said second arm, when said supporting shank is in an "open" position said step plate on said supporting shank is perpendicular to said second arm and is off set to the left of the cargo area.

2. The foldable step assembly of claim 1, further comprising:
    a securing rod fixedly disposed on said supporting shank by a spring plunger, wherein said securing rod is capable of screwing into one notch on said securing plate, thereby locking said supporting shank into one position.

3. The foldable step assembly of claim 1, further comprising:
    at least two support bars transversely mounted to said securing rod; and said step plate is bolted on said support bar.

4. The foldable step assembly of claim 1, further comprising an off-set pivot that slides said supporting shank along said second arm for positioning said supporting shank in an "in" position where said supporting shank is parallel and proximate said second arm for aesthetical purpose and in an "open" position where said supporting shank is perpendicular to said second arm and off-set to the left of the cargo area.

5. A foldable step assembly engageable with a trailer hitch receiver, comprising:
   a supporting base comprising a first arm and second arm, said first arm and said second arm being joined forming a "L" shape, said first arm having a first free end for coupling with a hitch receiver, said second arm having a second free end;
   a securing plate having plurality of notches, mounted to said second free end of said second arm;
   a supporting shank pivotally mounted to said securing plate, wherein said supporting shank being capable of rotating horizontally between an "in" position and an "open" position;
   at least two support bars having bores in the center transversely mounted on said supporting shank;
   a securing rod inserting through said bores into said support bars and being capable of screwing into one notch on said securing plate, thereby locking said supporting shank into one position; and
   a step plate mounted on said support bars, when said supporting shank is in an "in" position said step plate is parallel with said second arm, when said supporting shank in an "open" position said step plate is perpendicular to said second arm and is off set to the left of the cargo area.

6. The foldable step assembly engageable with a trailer hitch receiver of claim 5 wherein said securing rod having a first end a second end and a spring plunger which encloses part of said securing rod and work as locking and releasing means for said first end to screw into and release from one of notches, thereby locking said supporting shank into one position.

* * * * *